May 19, 1953 W. R. HARRY 2,639,396
COMMUTATOR, ARMATURE, AND METHOD OF MAKING THE SAME
Filed April 10, 1950 2 Sheets-Sheet 1
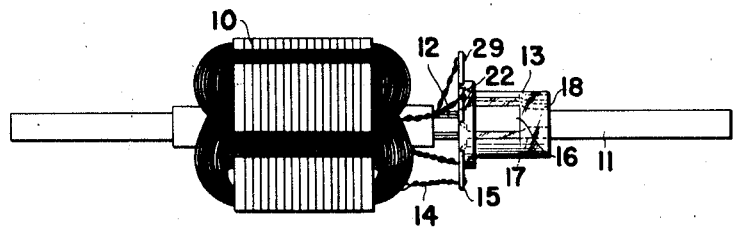
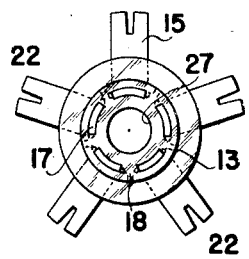
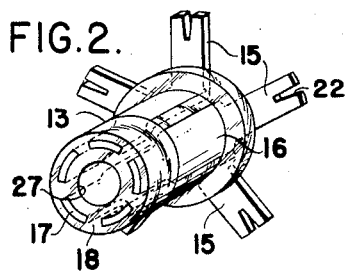
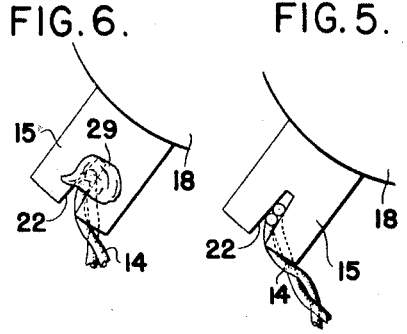
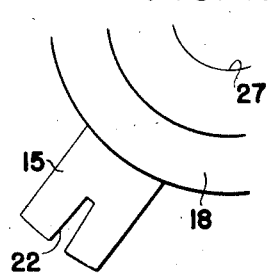
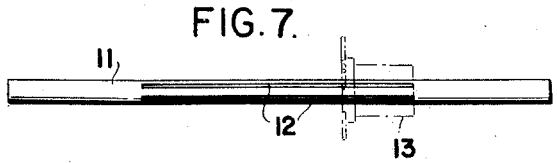

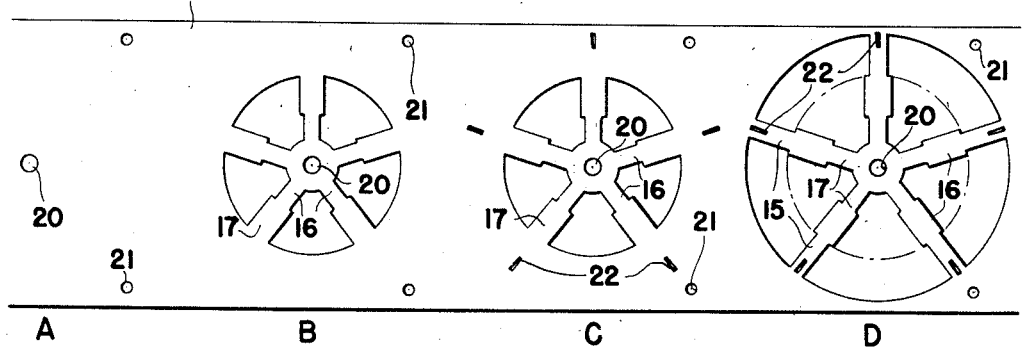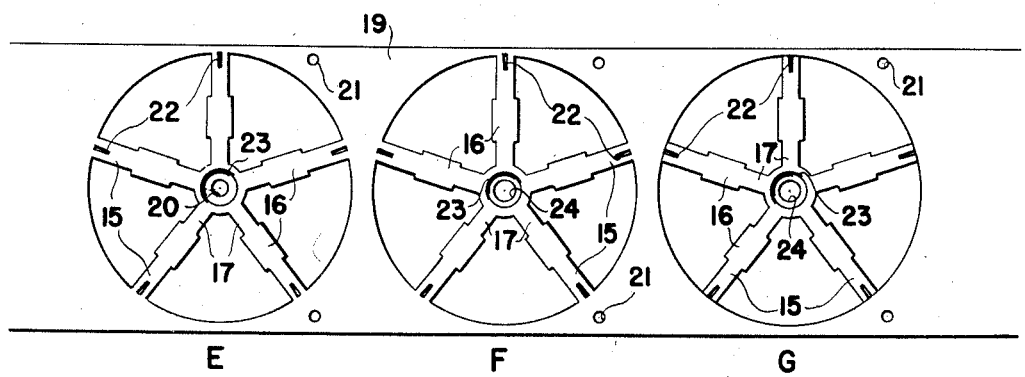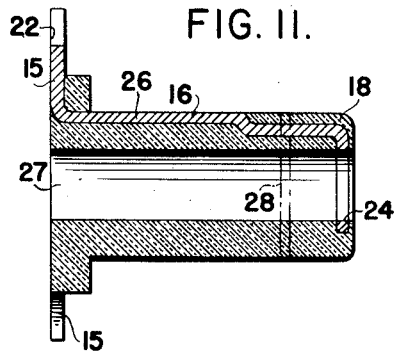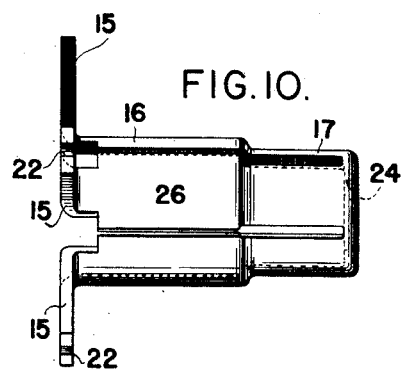

Patented May 19, 1953

2,639,396

UNITED STATES PATENT OFFICE 2,639,396

COMMUTATOR, ARMATURE, AND METHOD OF MAKING THE SAME

William R. Harry, Hartland, Wis., assignor to N. T. Kyle

Application April 10, 1950, Serial No. 155,012

3 Claims. (Cl. 310—235)

This invention relates to armatures for motors in its broadest sense and particularly to armatures for small motors.

Heretofore, in the manufacture of small motors such as are used in toys a desired objective was to provide an inexpensive motor being most efficient and having the lowest friction losses possible.

This objective has never fully been realized because the friction at the bearings and the friction between the brushes and the commutator have in general been so high as to render the motors relatively inefficient as compared with the motors of larger size. Furthermore, the commutators heretofore employed and the method of fastening and electrically connecting the windings to the commutator terminals have represented a substantial portion of the expense of producing these armatures, and so have rendered the motors relatively expensive.

One method previously used to produce small commutators employed a plurality of small parts including the necessary number of individual segments together with suitable insulating and constraining parts. The manufacture, handling and assembly of this plurality of small parts was time consuming and costly and contributed adversely to the cost of these motors.

Another method previously used to produce small commutators employed a tubular conducting element which was fabricated from extruded, drawn or stamped tubing. This tubular element was provided with a support of suitable plastic material, generally of the thermo-setting variety. Following this operation the tubular member was subdivided into the required number of segments by the machining of slots through the conductor and into the plastic. This latter operation in particular was time consuming and contributed adversely to the cost.

Another factor which has adversely affected the cost of these motors has been the process of attaching and electrically connecting the coils of the armature to the commutator bars, or segments. Insulated wire is employed for these coils, the insulation generally being enamel or more recently one of the modern tough plastic dielectric materials on the order of that commercially known as "Formvar." The removal of this insulation from the ends of the armature windings in order that they may be electrically connected to the commutator segments has been time consuming and costly.

Accordingly, it is an object of this invention to provide an armature for an electric motor which is inexpensive to manufacture.

Another object of this invention is to provide an armature for an electric motor, said armature being so arranged as to offer the least amount of frictional resistance in operation thereof.

Another object of this invention is to provide an armature which is capable of facile manufacture and assembly.

Another object of this invention is to provide a commutator for an armature formed out of a single strip of sheet metal.

Another object of this invention is to provide a commutator for an armature formed out of a single strip of sheet metal in such a manner that a single simple secondary operation is all that is required to electrically separate the several commutator segments.

Still another object of this invention is to provide an armature having a commutator which can be electrically connected to the coils of said armature in a facile manner.

A further object of this invention is to provide a commutator formed from a single strip of sheet metal providing individual segments which initially are separated one from another except for a relatively small connecting portion of the sheet metal so as to facilitate handling in subsequent operations, said portion being removed after the segments are bonded together by an insulating plastic.

These and other objectives of the invention will become apparent in the reading of the following description and claims in which the invention is clearly delineated and disclosed.

Fig. 1 shows a front elevation of a completely assembled armature.

Fig. 2 is a perspective view of a completely assembled commutator.

Fig. 3 is a side elevation of a complete commutator made in accordance with the teachings of this invention.

Fig. 4 is an enlarged broken away view of a terminal of the commutator segment showing the novel locking means.

Fig. 5 is an enlarged broken away segment of the terminal shown in Fig. 4 showing the leads of the armature coils in engagement therewith.

Fig. 6 is an enlarged broken away view of the terminal shown in Figs. 4 and 5 showing the leads facilely fastened to said terminal.

Fig. 7 is a front elevation of the armature shaft showing a commutator in broken lines pressed on said shaft.

Fig. 8 is a graphical representation of the metal forming steps, in which the armature blank is stamped out of sheet metal comprising the steps,

*a*, *b*, *c*, *d*, *e*, *f*, and *g*, hereinafter to be more fully described.

Fig. 9 is a cross-sectional view of the Fig. 8–*e* clearly showing the operation at that stage.

Fig. 10 is a front elevation of the commutator blank after the forming operation as shown in Fig. 8–9.

Fig. 11 is a cross-sectional view of the armature after the plastic has been molded around the blank shown in Fig. 10.

Referring to particular drawings, it will be noted in Fig. 1 that an armature 10 for a small motor is provided.

The entire armature assembly is pressed on the spline shaft 11 shown in Fig. 7. Also, laterally spaced on said spline shaft is the commutator 13. The leads 14 from the coils of the armature are shown attached or soldered to the terminal ears 15 in the slots 22. The segments 16 of the commutator are also shown.

Fig. 2 is a perspective view of the new and improved commutator. The novel commutator complete with its integral terminal means 15 is shown as a homogeneous article. The current carrying segments 16 are imbedded in nylon plastic 18, which is true in this case: Although any suitable thermal setting plastic or thermoplastic material or resin may be used. It is immediately apparent on examination of Figs. 2 and 11 that the thickness of plastic material 17 introduced between the commutator segments 17 and the shaft hole 27 has been reduced to the minimum consistent with adequate insulation. By the very nature of this construction the outside diameter of the segmented portion of the commutator has been reduced to the minimum permitted by the size of the shaft. This small diameter causes the brush friction to act on the commutator at the smallest possible radius and thus this friction loss is minimized.

Furthermore with the diameter of the commutator minimized the surface velocity of the commutator is reduced, this favorably affects the rate of brush and commutator wear and so remarkably increases the service life of the motor.

Fig. 3 is a side elevation of the armature shown in Fig. 2 and shows the integral segment and terminal character of this commutator.

Fig. 4 shows the terminals 15 with the locking slots 22. It will be noted that the locking slots are tapered so as to provide a lock for the leads from the coils of the armature as shown in Fig. 5. The coils of the armature consist of the appropriate size wire insulated with a modern dielectric on the order of that commercially known as "Formvar." This insulation is extremely thin and has very high dielectric strength. However, it at once poses a problem in an application such as this in that it is extremely difficult to remove this tenacious pellicle from the conductor. Of course, this enhances its value in assemblies such as armatures: However, the unstripability of insulation is extremely deleterious in the assembly of small armature motors.

This invention immediately overcomes these defects in an extremely facile manner as shown in Figs. 5 and 6. For, the leads 14 from the coils are twisted together. The lower lead is jammed in the tapered slot 22 and both leads are cut off flush with the topside of the terminal 15. This leaves bare sections in both conductors flush with the terminal 15. Next a drop of solder 29 binds the leads 14 to the terminal 15 in the best possible manner as shown in Fig. 6. Thus, a good electrical connection is made which lends itself most readily to modern production techniques.

The steps as to how the commutator is formed of a single piece of sheet metal are shown in Fig. 8 at the divers stages. The strip of metal 19 which the commutator is made of is brass or a copper base alloy sufficiently ductile to withstand the subsequent drawing operation. At station *a* the guide holes 21 are stamped into said strip along with the center hole 20. At station *b* a portion of the material is stamped out so as to initially form the commutator segments 17. At station *c* the tapered slots 22 are formed. At station *d* a further area is stamped out to form the commutator elements 17 with the integral terminal ears 15. At station *e* the central portion around the hole 20 is cupped, this is shown as 23 and the cross-sectional view shown in Fig. 9 more clearly shows this operation. At station *f* the bore 24 of the commutator is formed. At station *g* the integral terminals 15 and the entire starlike member is pushed into a die so as to form the resulting structure shown in Fig. 10. The integral assembly shown in Fig. 10 is next put into a die and a thermo-plastic, nylon in this case, is molded about the commutator assembly as shown in Fig. 11. It will be noted that a collar of plastic material is provided next to the upstanding terminal members 15. Further, an annular collar of plastic material circumferentially surrounds the segments at the point 28. These collars bind the commutator bars 16 into a single unitary assembly.

The next operation is a cut-off operation in which the lateral end of the assembly opposite the terminals 15 is trimmed off at the point 28 as shown in Fig. 11. This produces the integral commutator assembly shown in Fig. 2. In the next operation the integral commutator assembly is pressed on the spline shaft 12 as is shown in Fig. 7. Subsequent to this the coil assembly is pressed on the shaft and the coils are secured to their respective commutator bars as shown in Figs. 5 and 6.

It is apparent in the reading of the foregoing description and study of the drawings that a novel highly useful invention is delineated. This armature offers the best utilization of modern dielectric coatings in an extremely facile manner and further provides an inexpensive armature which has relatively small frictional losses when used in a motor. The integral commutator formed of sheet metal and molded in a plastic substance is manufactured cheaply and lends itself to mass production techniques most readily. Further, the resulting product is strong and electrically bonded in the best possible manner.

The invention although in the art of motors is broad in its particular aspects and is to be limited only by the clear import of the following claims.

I claim:

1. A small commutator formed of sheet metal having terminal members and current carrying segments, said segments and terminal members being integral, said segments being regularly, radially deployed; said segments being bonded together but electrically isolated from each other solely by a thermo-plastic insulating material without mechanical locking means, said segment members curved so as to form a lesser diameter at a lateral edge of said commutator, said thermo-plastic insulating material further providing passage means for a shaft, an annulus of thermo-plastic material surrounding said lateral edge of the commutator while homogeneously bonding the entire assembly together whereby a strong commutator of small diameter is provided, and said annulus being of the same outer diameter as the outer diameter of the brush contacting portions of the commutator bar segments.

2. A small armature assembly comprising a shaft, electromagnetic means, a small commutator formed of said metal having terminal members and current carrying segments, said segments and terminal members being integral, said segments being regularly, radially deployed; said segments being bonded together but electrically isolated from each other solely by a thermoplastic insulating material without mechanical locking means, said segment members curved so as to form a lesser diameter at a lateral edge of said commutator, said thermo-plastic insulating material further providing passage means for a shaft, an annulus of thermo-plastic material surrounding said lateral edge of the commutator while homogeneously bonding the entire assembly together whereby a strong commutator of small diameter is provided, and said annulus being of the same outer diameter as the outer diameter of the brush contacting portions of the commutator bar segments.

3. A small armature assembly comprising a shaft, electromagnetic means, a small diameter commutator formed of sheet metal having terminal members and current carrying segments, said segments and terminal members being integral, said segments being regularly, radially deployed; said segments being bonded together but electrically isolated from each other solely by a thermoplastic insulating material without mechanical locking means, said segment members curved so as to form a lesser diameter at a lateral edge of said commutator, said thermo-plastic insulating material further providing passage means for a shaft, an annulus of thermo-plastic material surrounding said lateral edge of the commutator while homogeneously bonding the entire assembly together whereby a strong commutator of small diameter is provided, and said annulus being of the same outer diameter as the outer diameter of the brush contacting portions of the commutator bar segments, said commutator assembly further having the thermo-plastic insulating material resilient so that the bore of said commutator may engage the shaft in locked relationship.

WILLIAM R. HARRY.

References Cited in the file of this patent

UNITED STATES PATENTS

| Number | Name | Date |
|---|---|---|
| 1,358,691 | Allen | Nov. 16, 1920 |
| 1,407,776 | Stone | Feb. 28, 1922 |
| 1,432,038 | Russell | Oct. 17, 1922 |
| 1,578,793 | Apple | Mar. 30, 1926 |
| 1,631,461 | Bonsieur | June 7, 1927 |
| 1,633,922 | Carter | June 28, 1927 |
| 1,757,393 | Schmid | May 3, 1930 |
| 1,816,629 | Worner | July 28, 1931 |
| 1,826,443 | Aufiero | Oct. 6, 1931 |
| 1,875,204 | Apple | Aug. 30, 1932 |
| 2,236,257 | Borchers | Mar. 25, 1941 |
| 2,256,321 | McCusker | Sept. 16, 1941 |
| 2,400,590 | Meyerhoefer | May 25, 1946 |
| 2,476,795 | Avigdor | July 19, 1949 |

FOREIGN PATENTS

| Number | Country | Date |
|---|---|---|
| 596,115 | Great Britain | Dec. 29, 1947 |